(12) United States Patent
Kosmowski et al.

(10) Patent No.: US 8,461,482 B2
(45) Date of Patent: Jun. 11, 2013

(54) PRE-PROCESS STRESS LOADING COMPONENTS FOR POST-PROCESS WARP CONTROL

(75) Inventors: Mark T. Kosmowski, Beaverton, OR (US); Mehmet E. Alpay, Portland, OR (US)

(73) Assignee: Electro Scientific Industries, Inc., Portland, OR (US)

(*) Notice: Subject to any disclaimer, the term of this patent is extended or adjusted under 35 U.S.C. 154(b) by 851 days.

(21) Appl. No.: 12/483,544

(22) Filed: Jun. 12, 2009

(65) Prior Publication Data

US 2009/0314754 A1 Dec. 24, 2009

Related U.S. Application Data

(60) Provisional application No. 61/073,644, filed on Jun. 18, 2008.

(51) Int. Cl.
*B25B 1/22* (2006.01)
*H05H 7/00* (2006.01)
*B23K 26/38* (2006.01)

(52) U.S. Cl.
USPC .................. 219/121.82; 269/296; 29/446

(58) Field of Classification Search
USPC ........... 219/121.63–121.72, 121.82; 269/296; 29/446
See application file for complete search history.

(56) References Cited

U.S. PATENT DOCUMENTS

| | | | | |
|---|---|---|---|---|
| 3,760,652 A | * | 9/1973 | Joyard et al. | 74/527 |
| 4,084,739 A | * | 4/1978 | Koltz et al. | 228/168 |
| 4,444,604 A | * | 4/1984 | Martin | 148/646 |
| 4,595,360 A | * | 6/1986 | Zaiser | 432/253 |
| 5,271,363 A | * | 12/1993 | Derra | 123/193.2 |
| 5,603,853 A | * | 2/1997 | Mombo-Caristan | 219/121.64 |
| 5,713,506 A | * | 2/1998 | Erikson et al. | 228/44.3 |
| 2003/0121574 A1 | | 7/2003 | Brenner et al. | |
| 2004/0032272 A1 | * | 2/2004 | Maruyama et al. | 324/754 |

FOREIGN PATENT DOCUMENTS

| | | |
|---|---|---|
| EP | 0 190 378 A1 | 8/1986 |
| JP | 63-130295 A | 6/1988 |
| JP | 07016776 A * | 1/1995 |
| JP | 09122952 A * | 5/1997 |
| JP | 2004-216440 A | 8/2004 |

\* cited by examiner

*Primary Examiner* — Samuel M Heinrich
(74) *Attorney, Agent, or Firm* — Young Basile

(57) ABSTRACT

A process and apparatus neutralizes a warp effect resulting from a build up of micro strains caused by machining a part with a long wavelength laser. The part to be machined is pre-stressed in an opposite direction of a warp stress due to machining using a fixture for holding the part without yielding any other features in the part. The part is machined while held in the pre-stressed position in the fixture.

20 Claims, 9 Drawing Sheets

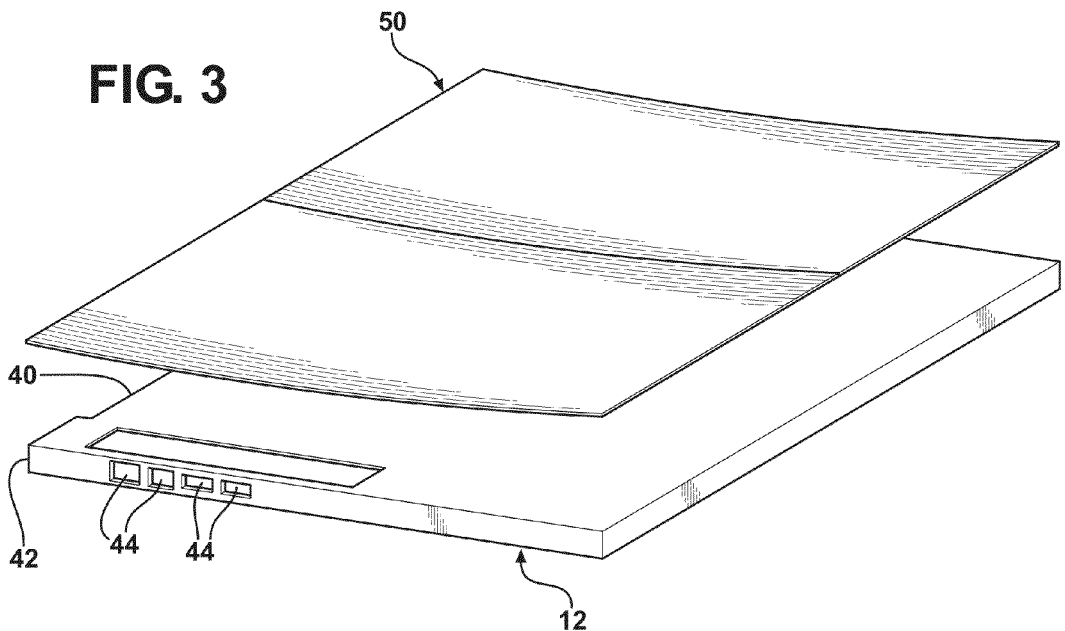
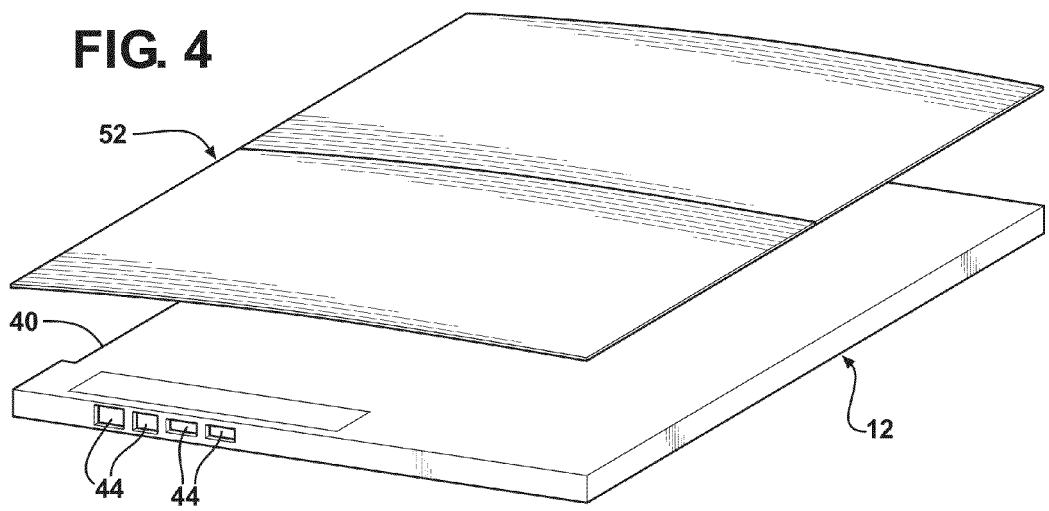

FIG. 5
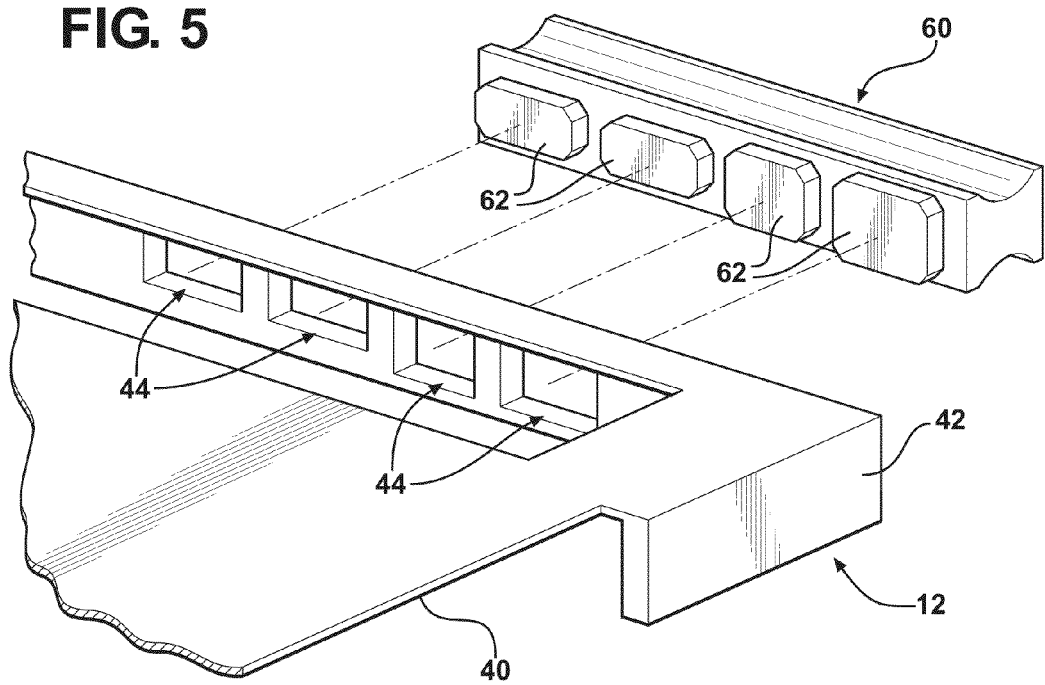
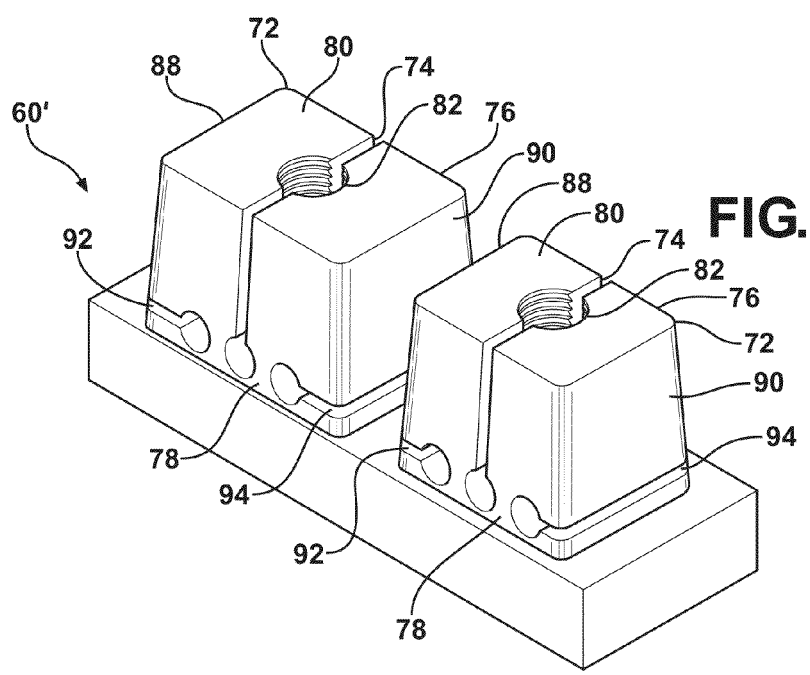
FIG. 6

PRE-PROCESS STRESS LOADING COMPONENTS FOR POST-PROCESS WARP CONTROL

CROSS-REFERENCE TO RELATED APPLICATION

This application claims priority to U.S. Provisional Patent Application Ser. No. 61/073,644, filed Jun. 18, 2008, which is incorporated herein in its entirety by reference.

FIELD OF THE INVENTION

The present invention relates to an apparatus and process technique to neutralize the warp effect caused by the build up of micro strains caused by machining parts with a long wavelength laser.

BACKGROUND

Machining metal parts with a long wavelength laser in general, and in particular to the cutting of vias in metal material using a long wavelength laser is known. Information regarding cutting of vias in metal material can be obtained from U.S. Patent Application Publication No. 2007/0291496.

SUMMARY

When machining components with long wavelength lasers, much of the machining process is thermal. This thermal material removal process causes a heat affected zone and a molten zone to occur in the machining part. During the cutting process, the molten zone expands and transitions to a liquid state. The heat affected zone also expands and rises in temperature where the metal is annealed locally. Shortly after the laser has machined the area of metal, the heat affected zone and molten zone cool down and shrink in volume. Since the cooling gradient is not uniform (that is, the heat affected zone cools down to ambient faster than the molten zone), a small strain zone that deflects the machining part locally occurs. As more of the part is machined, the strain zone deflections build on each other and cause a large deflection in the part commonly known as a warp.

The macro warping of the machined part as described above is addressed by embodiments of the invention, which include a technique to neutralize the warp effect caused by the build up of micro strains caused by machining parts using a long wavelength laser.

The warping phenomenon is very repeatable. Once it is characterized in a metal part, developing a technique to pre-stress the part in the opposite direction of the warp is relatively simple as long as the part can be properly fixtured without yielding any other features in the part. In particular, the part to be machined is pre-stressed in an opposite direction of a warp stress due to machining with a fixture for holding the part without yielding any other features in the part. The part is then machined while held in the fixture.

If the part has features that induce high stress concentrations, it is possible to reinforce such areas to keep the high stress zones from yielding. In particular, inserts having a precise fit with the features may be placed into the features to restrain the features and to prevent the features from yielding. As an alternative, expandable inserts may be placed into the features and expanded until they have such a precise fit.

According to certain embodiments, the part may include a thin flat sheet of a metal material, such as aluminum. Details and variations of these embodiments and others are described herein.

BRIEF DESCRIPTION OF THE DRAWINGS

The description herein makes reference to the accompanying drawings wherein like reference numerals refer to like parts throughout the several views, and wherein:

FIG. 3 is a simplified perspective view of a typical part with concave warp profile set above it;

FIG. 4 is a simplified perspective view of a typical part with a convex pre-stress profile set above it;

FIG. 5 is a simplified perspective view of a typical part with stress concentration geometry and a reinforcing portion having restraining inserts;

FIG. 6 is a perspective view of an alternative reinforcing portion having expandable inserts.

DETAILED DESCRIPTION

Figure 1:
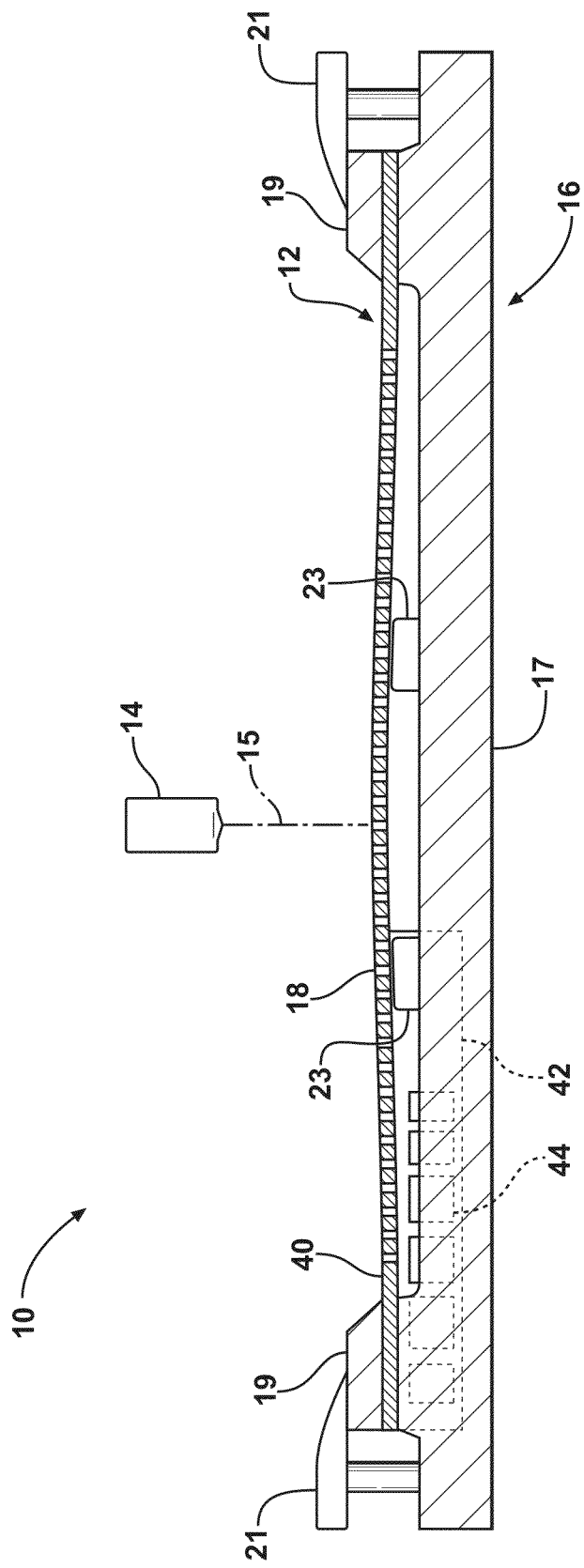
FIG. 1 is an illustration showing an apparatus for machining a part with a long wavelength laser.

FIG. 1 shows a relevant portion of an apparatus 10 for machining a part 12 with a long wavelength laser 14 that produces a beam 15 suitable for machining part 12. As will be explained herein, apparatus 10 and an associated method according embodiments of the present invention are directed most generally to neutralizing a warp effect resulting from a build up of micro strains caused by machining part 12 with long wavelength laser 14.

Part 12 may include or be in the form of a thin flat sheet, and long wavelength laser 14 is utilized to cut one or more apertures 18 through part 12. Apertures 18 extend from an upper face to a lower face of part 12 such that apertures 18 extend substantially perpendicular to a plane defined by part 12.

Apparatus 10 includes a fixture 16 that holds part 12 in a predetermined position and profile with respect to long wavelength laser 14 while long wavelength laser 14 is utilized to cut one or more features into or through part 12. Fixture 16 includes a base portion 17 and pressure plates 19 that are adapted to engage the lower and upper surfaces, respectively, of part 12 at opposed ends of part 12. That is, each end of part 12 is captured between base portion 17 and one of pressure plates 19. In this example, where part 12 is substantially rectangular as shown in FIGS. 3 and 4, pressure plates 19 extend along the length of opposing edges of part 12. One or more clamps 21 are utilized to secure base portion 17 and pressure plates 19 with respect to part 12. Fixture 16 also includes one or more fingers 23 that extend upward from base portion 17 and are engageable with part 12. As explained hereinafter, part 12 is held in a predetermined profile through engagement of fingers 23 with the lower surface of part 12.

Base 17 and laser 14 are generally incorporated into any number of laser micro-machining systems. For example, base 17 is removably fixed to a base of the laser micro-machining system, and laser 14 is generally supported by a gantry system for movement with respect to base 17. Base 17 can also be mounted for movement with respect to laser 14. Suitable laser micro-machining systems are available from Electro Scientific Industries, Inc. of Portland, Oreg. and sold as Model Nos. 5330, 5530, 5650 and 5800.

The term "long wavelength laser" is defined to include, for example, an infrared wavelength laser. By way of example and not limitation, the long wavelength laser can have a wavelength of greater than approximately 750 nanometers (nm), and more preferably a wavelength of between approximately 900 nanometers (nm) and approximately 800 micrometers (μm). In certain embodiments, a wavelength of between approximately 900 nanometers (nm) and approximately 9000 nanometers (nm) is preferable. Most preferably, but not necessarily, a wavelength of between approximately 1000 nanometers (nm) and approximately 1100 nanometers (nm) is used. Additional information regarding machining metal parts with a long wavelength laser in general, and in particular to the cutting of vias in a metal material using a long wavelength laser, can be obtained from U.S. Patent Application Publication No. 2007/0291496, which is incorporated by reference herein in its entirety.

The term "thin" when used with respect to a flat sheet of material is defined as a sheet having a thickness of less than 1000 microns (μm), and more preferably between 100 microns (μm) and 1000 microns (μm). The term "flat" as used with respect to the sheet of material is not to be considered limiting. In particular, the sheet of material can have any desired contour for the finished product or part. As long as the contoured product or part can be bent sufficiently in a pre-stressed counter warp direction configuration to offset laser machining induced warp without producing any yielding of associated high stress concentration features using the process and apparatus of the present invention, it is considered to be within the scope of the invention.

By way of example and not limitation, the term "material" as used with respect to the thin flat sheet is defined as a homogenous metal material, and more particularly aluminum material. However, it is anticipated that other materials subject to laser machining induced warping could be processed using the invention including materials selected from another homogenous metal material besides aluminum, a composite metal material, a resin material, a resin material including a fiber filler, a resin material including glass fiber filler, a composite resin and metal material, a composite resin, fiber filler, and metal material, and any combination thereof.

Formation of the warp effect is now explained with reference to FIGS. 2A-2I, which show a plurality of holes 20 machined with long wavelength laser 14 into an aluminum sample 22 representative of part 12. Machining of aluminum sample 22 with long wavelength laser 14 causes formation of a localized heat affected zone 24 and a molten zone 26 in an area surrounding each of holes 20. During the cutting process, molten zone 26 expands and transitions to a liquid state. Heat affected zone 24 also expands and rises in temperature where the metal of aluminum sample 22 is annealed locally. Shortly after long wavelength laser 14 has machined hole 20 into aluminum sample 22, heat affected zone 24 and molten zone 26 cool down and shrink in volume.

Subsequent to machining with long wavelength laser 14, the cooling gradient in the material adjacent to the holes is not uniform, in that heat affected zone 24 cools down to ambient faster than molten zone 26. This causes formation of a small strain zone 28 that deflects the part locally. The deflection caused by a single strain zone 28 is insignificant in nature. However, as more of the part is machined, the localized deflections caused by strain zones 28 build on each other and cause a large, macro level deflection in the part commonly referred to as the warp effect.

Figure 2A:
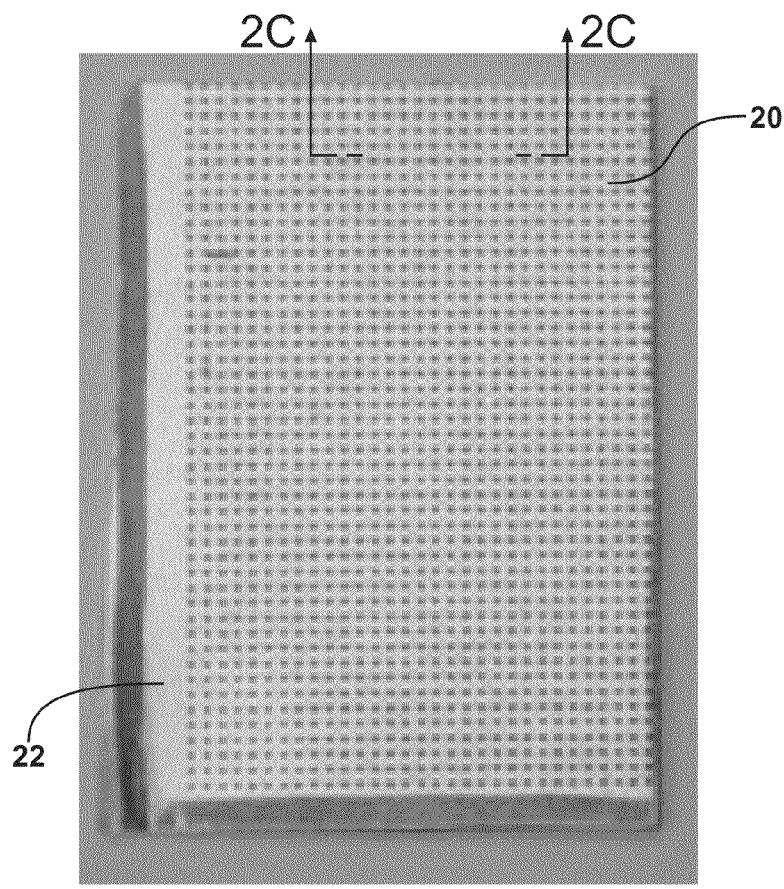
FIG. 2A is a top view of an aluminum sample that was machined with a long wavelength laser.

FIG. 2A is a top view of aluminum sample 22 subsequent to laser cutting or machining with long wavelength laser 14. Aluminum sample 22 was prepared for optical and SEM (scanning electron microscope) imaging by preparing a first portion 30 and a second portion 32 as specimens.

Figure 2B:
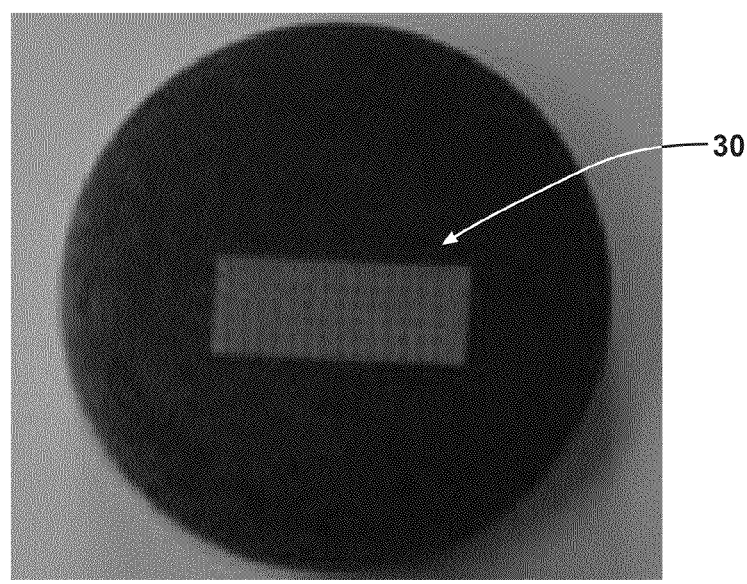
FIG. 2B is a top view of a first portion of the aluminum sample of FIG. 2A that has been cut and mounted for testing.

First portion 30 was prepared for imaging by cutting through aluminum sample 22 to provide a substantially rectangular specimen including an array of completely intact holes 20 and by mounting the specimen as shown in FIG. 2B. First portion 30 is thus adapted for inspection from a top-down or bottom-up perspective.

Figure 2C:
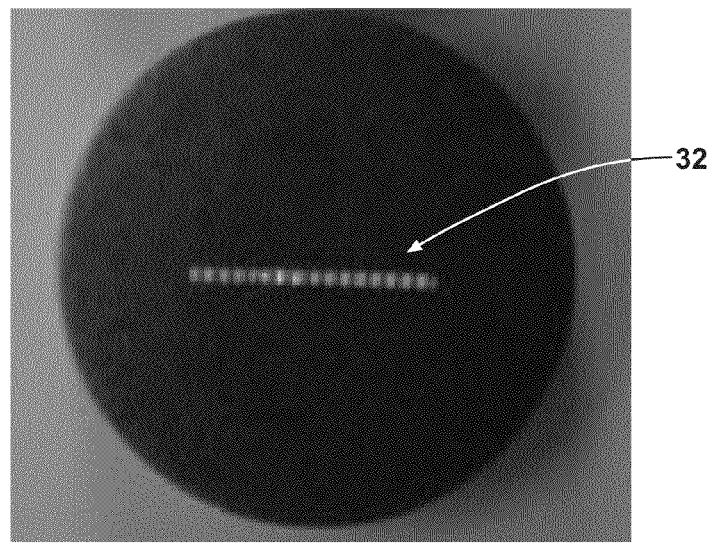
FIG. 2C is a top view of a second portion of the aluminum sample of FIG. 2A that has been cut and mounted for testing.

Second portion 32 was prepared for imaging by cutting through aluminum sample 22 to provide an elongate specimen that, along its elongate sides 34, bisects a plurality of holes 20 along their respective longitudinal axes and by mounting the specimen as shown in FIG. 2C. Second portion of 32 is thus adapted for inspecting the cross-sectional properties of holes 20.

Figure 2D:
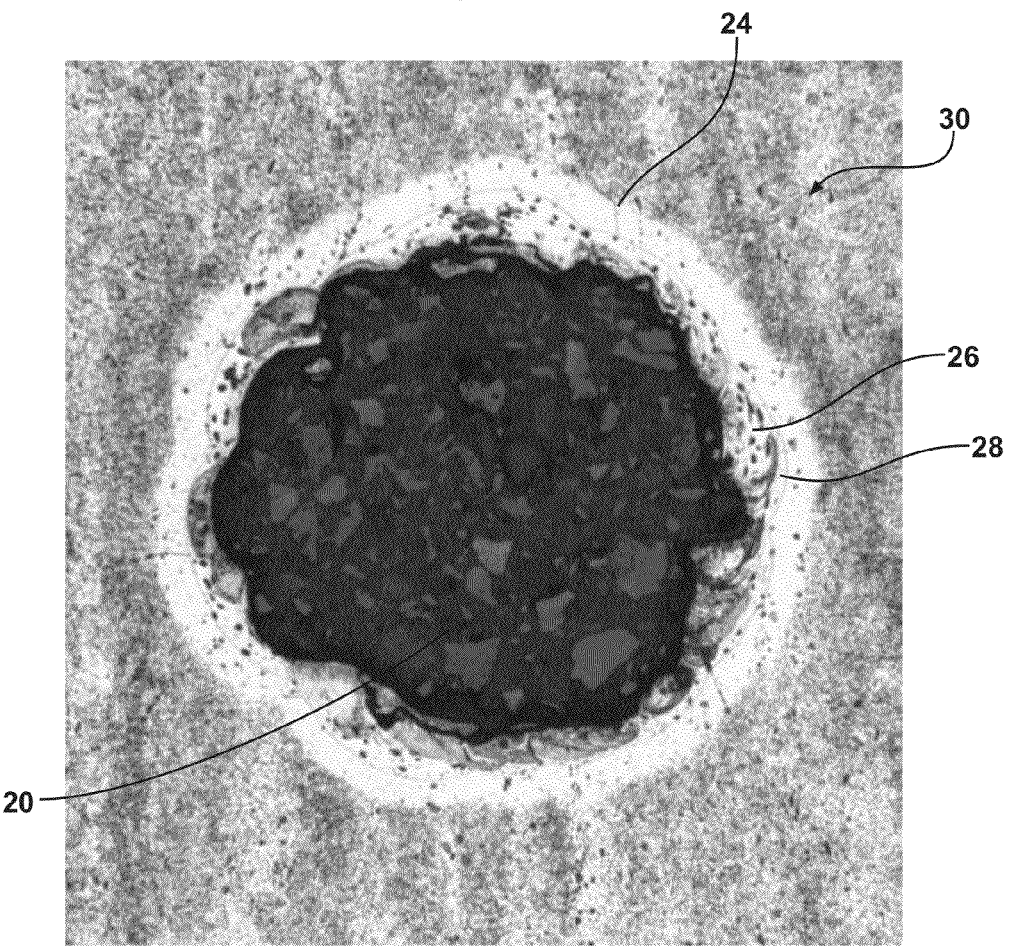
FIG. 2D is a 100× magnification optical image of the first portion taken from a top-down point of view.
Figure 2E:
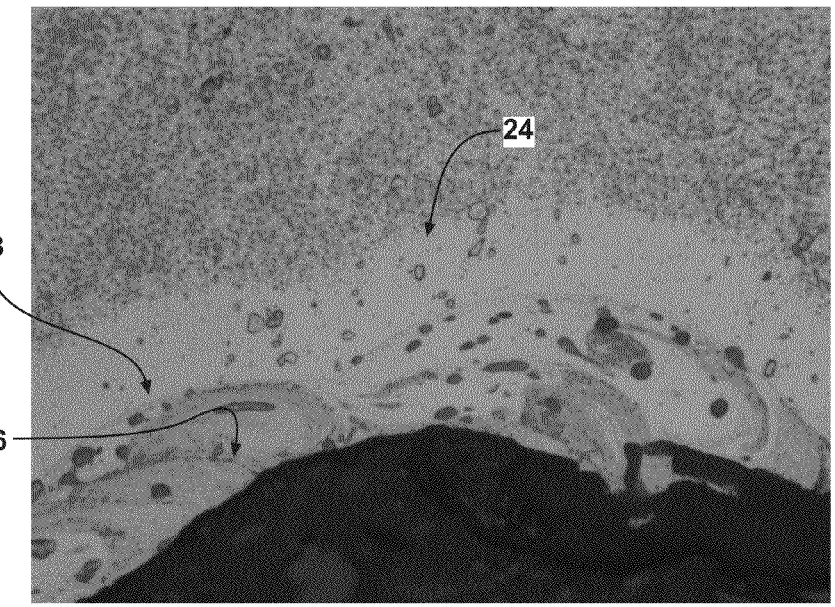
FIG. 2E is a 200× magnification bright field optical image of the first portion taken from a top-down point of view.
Figure 2F:
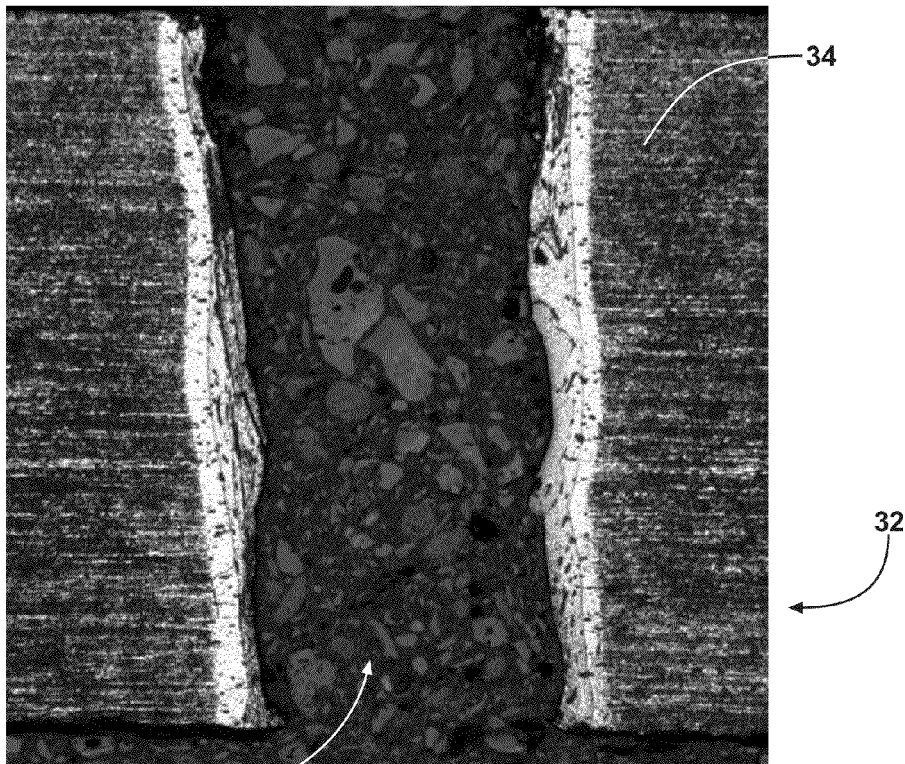
FIG. 2F is a 50× magnification bright field optical image of the second portion.
Figure 2G:
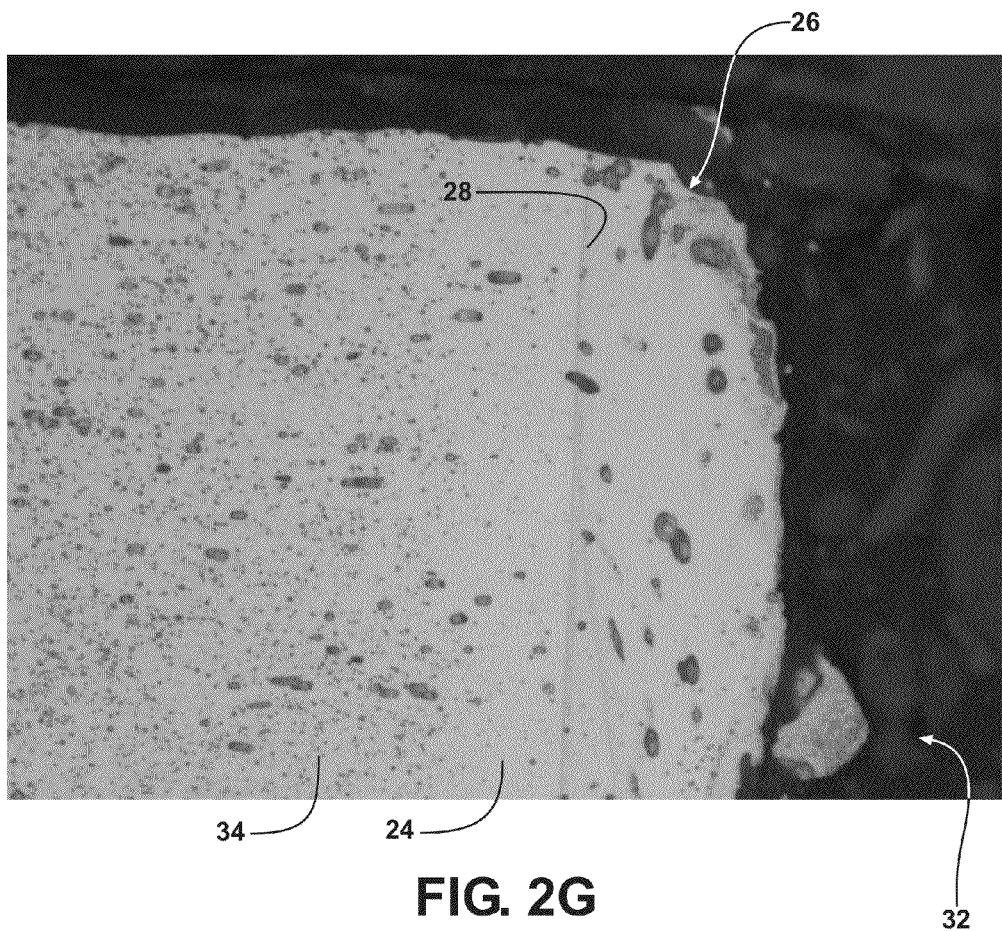
FIG. 2G is a 200× magnification bright field optical image of the second portion.

A 100× optical image of first portion 30 with a top down view is shown in FIG. 2D. A 200× bright field optical image of first portion 30 with a top down view is shown in FIG. 2E. A 50× bright field optical image of second portion 32 is shown in FIG. 2F. A 500× bright field optical image of second portion 32 is shown in FIG. 2G. In FIGS. 2D-2G, heat affected zone 24 and molten zone 26 can be identified. Dark field optical images also show these zones.

Figure 2H:
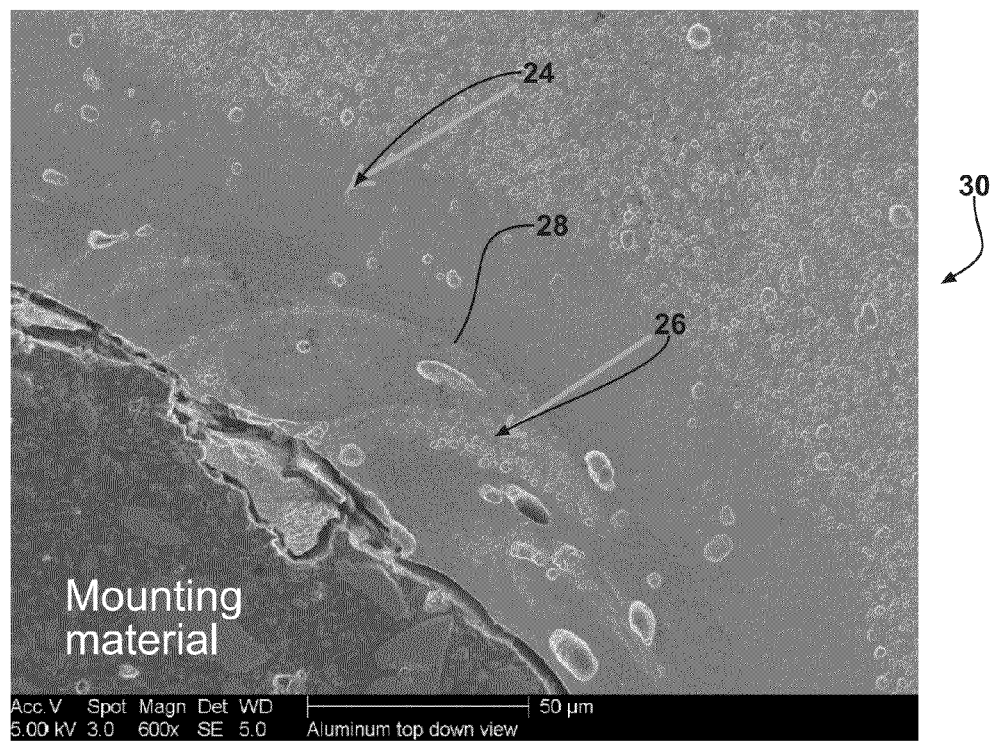
FIG. 2H is a 600× magnification SEM micrograph of first portion taken from a top-down point of view.
Figure 2I:
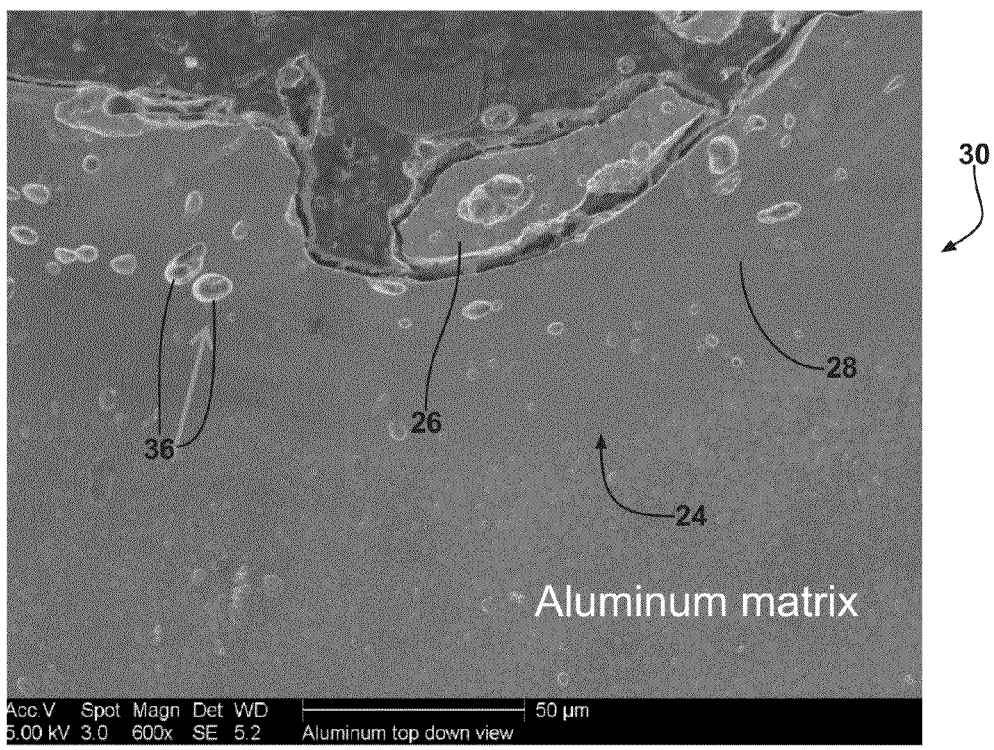
FIG. 2I is a 600× magnification SEM micrograph of first portion taken from a top-down point of view.

A 600× SEM image of first portion 30 with a top down view in FIG. 2H shows heat effected zone 24 and molten zone 26. FIG. 2I is a 600× SEM image of first portion 30 showing precipitates 36 in the aluminum matrix.

Micro-hardness tests of a sampling locations of aluminum sample 22 after drilling show that the hardness values of material heat effected zone 24 and molten zone 26 are reduced below that of the base material.

By way of example and not limitation, an embodiment of the invention is described wherein part 12 is a thin flat sheet 40 of material that has a rim 42 around most of its perimeter and may have numerous features machined into it, as best seen in FIGS. 1 and 3-5. In particular, high stress concentrations are introduced into areas of part 12 adjacent to features 44 that are machined into rim 42. For example, features 44 may include a plurality of square or rectangular apertures arranged along rim 42 in a side-by-side fashion.

When part 12 is machined with long wavelength laser 14, the warp effect described previously tends to warp part 12 according to a substantially concave warp profile 50, as best seen in FIG. 3, where concave warp profile 50 is illustrated adjacent to part 12 for reference purposes. Concave warp profile 50 may be established empirically, by machining part 12 using long wavelength laser 14 without pre-stressing part 12, and then measuring the resulting concave warp profile 50 of part 12 directly. Of course, other known methods may be used to establish parameters of concave warp profile 50.

In order to neutralize the warp effect represented by concave warp profile 50, fixture 16 is configured to pre-stress part 12 in a magnitude and direction that is based on concave warp profile 50. In particular, fixture 16 is configured to flex part 12 into a convex pre-stressed profile 52, as best seen in FIG. 4, through engagement of upstanding fingers 23 of fixture 16 with part 12 (FIG. 1). Convex pre-stressed profile 52 is in the opposite direction of but has approximately the same magnitude as concave warp profile 50. Part 12 is machined while it is held in pre-stressed convex profile 52. When part 12 is released from fixture 16, stresses induced during machining by long wavelength laser 14 counteract the pre-stressing applied by fixture 16, causing part 16 to assume a nominal, unwarped profile, thereby neutralizing the warp effect.

In the example of part 12 shown in FIG. 1, two fingers 23 are equidistantly-spaced from a center portion of part 12. Two other fingers 23 are similarly-spaced from the center portion of part 12 and are located along the length of part 12. Parts of different sizes and shapes may use a different number and/or differently-shaped fingers 23 based on the desired convex pre-stressed profile 52.

When part 12 is flexed by fixture 16 into convex pre-stressed profile 52, stresses are induced in part 12. In certain cases, these stresses may exceed the yield strength of the material from which part 12 is fabricated at areas of part 12 that tend to induce high stress concentrations, such as features 44. To keep features 44 from yielding, a reinforcing portion 60 can be provided on fixture 16 as shown in FIG. 5.

In order to prevent yielding of features 44, reinforcing portion 60 of the fixture 16 includes one or more inserts 62 are associated, either directly or indirectly, with fixture 16. Inserts 62 have a very precise fit to the high stress geometry of the features 44. Inserts 62 are placed within features 44, and the precise fit of inserts 62 with respect to features 44 causes the stress induced in part 12 by fixture 16 to be redistributed within part 12 in the vicinity of features 44, thereby lessening the magnitude of stress concentrations that are induced by features 44. In this manner, inserts 62 restrain features 44 and keep features 44 from yielding.

While inserts 62 have been described as provided on reinforcing portion 60 of fixture 16 and thus associated, directly or indirectly, with fixture 16, it should be understood that this is not the only manner in which inserts 62 may be provided. Rather, inserts 62 may be provided in any manner suitable to restrain features 44 and keep features 44 from yielding. Thus, it is sufficient for inserts 62 to be assembled with respect to features 44 in any suitable manner.

Figure 7:
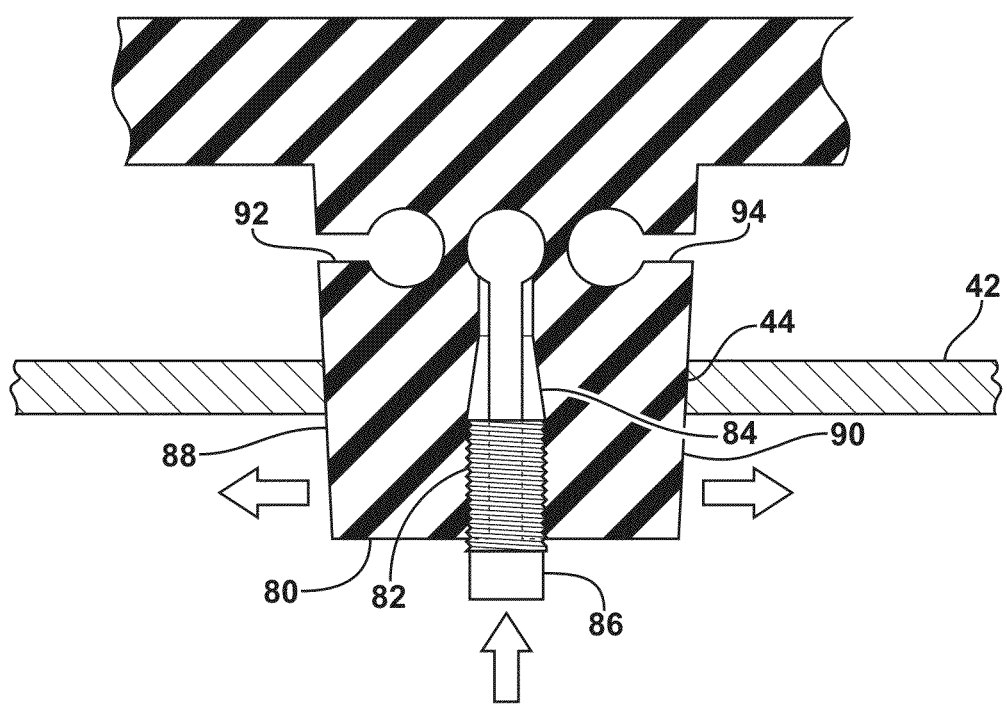
FIG. 7 is a cross-sectional view of an expandable insert according to FIG. 6.

Alternatively, reinforcing portion 60' of fixture 16 may be provided with one or more expandable inserts 72 in order to ensure and or enhance the precise fit required to reinforce features 44. As shown in FIGS. 6-7, and similar to inserts 62 of FIG. 5, expandable inserts 72 are intended to provide a very precise fit to the high stress geometry of features 44 and are placed into features 44 to reduce the magnitude of the stress concentrations, thus restraining features 44 and keeping features 44 from yielding. However, in contrast to the fixed-size inserts 62, expandable inserts 72 allow for a slight variation in their size so they may be expanded to have a very precise fit with features 44. This adjustability allows expandable inserts 72 to achieve a precise fit with features 44 despite manufacturing variations in part 12, and thus allows for a larger range of acceptable design tolerances.

In order expand and adjust expandable inserts 72, each expandable insert 72 may be provided in the form of a tapered hexahedron having an expansion slot 74. Expansion slot 74 extends from a top face 76 to an opposed bottom face 78 of the expandable insert 72, as well as through a front face 80 of expandable insert 72. A threaded bore 82 is formed within expansion slot 74 and extends into expandable insert 72 from front face 80. A threaded tapered portion 84 is formed within threaded bore 82 such that advancing a set screw 86 into tapered portion 84 of threaded bore 82 causes expansion slot 82 to expand, thereby moving a first lateral face 88 and an opposed second lateral face 90 of expandable insert 72 away from one another and into contact with walls of a feature 44.

In order to provide a greater degree of expansion for expandable insert 72, a first contraction slot 92 and a second contraction slot 94 may be provided on the expandable insert 72 and oriented substantially perpendicular to expansion slot 74. First contraction slot 92 extends from top face 76 to bottom face 78, as well as through first lateral face 88. Second contraction slot 94 extends from top face 76 to bottom face 78, as well as through second lateral face 90. In this manner, first contraction slot 92 and second contraction slot 94 are configured such that expansion of expansion slot 74 in response to advancement of set screw 86 causes contraction of contraction slots 92, 94. Thus, first contraction slot 92 and second contraction slot 94 allow a high degree of expansion of expansion slot 74 without causing an undesired deformation of alternative reinforcing portion 60' of fixture 16.

It should be understood that the part to be machined can be of any desired configuration and need not be limited to a thin flat sheet of material. It should also be recognized that the features with high stress concentrations can be of any desired configuration and need not be limited to those illustrated in the figures.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. In a process for machining parts using a long wavelength laser, the improvement comprising:
   neutralizing a warp effect resulting from machining a part with a long wavelength laser by pre-stressing the part into a pre-stressed position with a fixture in an opposite direction of a warp stress that will result from machining the part; and
   machining the part while it is held in the pre-stressed position by the fixture wherein machining the part comprises cutting into a surface of the part.

2. The process of claim 1 wherein the part includes a thin flat sheet of aluminum and the machining step comprises cutting apertures through the part.

3. The process of claim 1, further comprising:
   reinforcing a feature of the part that induces a high stress concentration in the part before machining the part to prevent the feature from yielding during the machining step wherein the feature is an aperture extending through the part.

4. The process of claim 1, further comprising:
   before pre-stressing and machining the part, placing an insert within a feature existing in the part, the insert having a precise fit with the feature to prevent the feature from yielding while pre-stressing the part and holding the part in the pre-stressed position wherein the feature is an aperture extending through the part.

5. The process of claim 1, further comprising:
   before pre-stressing and machining the part, placing an expandable insert into a feature existing in the part before machining the part; and expanding the expandable insert until the expandable insert has a precise fit with the feature to restrain the feature and keep the feature from yielding while holding the part in the pre-stressed position, wherein the feature is an aperture extending through the part.

6. The process of claim 1 wherein pre-stressing the part into the pre-stressed position with the fixture comprises:
   laying the part along a base portion of the fixture, at least one finger extending from the base portion to contact a lower surface of the part; and
   clamping opposite ends of the part to the base portion such that the at least one finger forces the part into the pre-stressed position; and wherein machining the part while it is held in the pre-stressed position by the fixture comprises:
   machining the upper surface of the part, the upper surface opposite from the lower surface.

7. The process of claim 1, further comprising:
   before pre-stressing the part, placing expandable inserts into features of the part that induce high stress concentrations, wherein the features include a plurality of openings through a surface of the part adjacent to one of the top surface or the bottom surface; and
   expanding the expandable inserts until the inserts have a precise fit with the features to restrain the features and to prevent the features from yielding while pre-stressing and machining the part.

8. A process for machining parts using a long wavelength laser, comprising:
   determining a warp stress profile resulting from machining a part with a long wavelength laser;
   pre-stressing the part to be machined in a pre-stress profile, the pre-stress profile having a direction opposing the warp stress profile; and
   machining the part with a long wavelength laser by cutting into a surface of the part while it is held in the pre-stress profile such that the warp stress profile otherwise resulting from the machining is neutralized.

9. The process of claim 8 wherein pre-stressing the part comprises:
   holding the part in the pre-stress profile in a fixture without yielding any other features in the part; and wherein machining the part is performed while holding the part in the fixture and includes cutting a plurality of apertures through the part.

10. The process of claim 8, further comprising:
    reinforcing features of the part that induce high stress concentrations in the part to prevent the features from yielding while machining the part.

11. The process of claim 8, further comprising:
    before pre-stressing and machining the part, placing an insert having a precise fit within a feature in the part to restrain the feature and to prevent the feature from yielding.

12. The process of claim 8, further comprising:
    before pre-stressing and machining the part, placing an expandable insert into a feature of the part; and
    expanding the expandable insert until the expandable insert has a precise fit with the feature; and wherein machining the part includes machining the part after placing the expandable insert and expanding the expandable insert.

13. The process of claim 8 wherein pre-stressing the part comprises:
    laying the part along a base portion of the fixture, at least one finger extending from the base portion to contact a lower surface of the part; and
    clamping opposite ends of the part to the base portion such that the at least one finger forces the part into the pre-stressed position; and wherein machining the part comprises:
    machining the upper surface of the part, the upper surface opposite from the lower surface.

14. In an apparatus for machining parts using a long wavelength laser, the improvement comprising:
    a fixture configured to neutralize a warp effect resulting from machining a part with a long wavelength laser to cut through surface of the part by pre-stressing and holding the part in a pre-stressed position in a direction opposite to a warp stress that will result from machining the part.

15. The apparatus of claim 14 wherein the fixture holds the part without yielding any features extending through the part while pre-stressing and machining the part.

16. The apparatus of claim 14, further comprising:
    a reinforcing portion that reinforces a feature existing in the part while the fixture holds the part and while machining the part to prevent the feature from yielding while machining the part.

17. The apparatus of claim 16 wherein the reinforcing portion includes at least one insert having a precise fit to the feature of the part.

18. The apparatus of claim 16 wherein the reinforcing portion includes at least one expandable insert that is configured to be placed into the feature and to be expanded until the expandable insert has a precise fit with the feature.

19. The apparatus of claim 14 wherein the fixture comprises:
    a base portion;
    at least one finger extending from the base portion; and
    clamps on opposite ends end of the base portion and configured such that when the part is placed on the base portion and clamped to the base portion by the clamps, the at least one finger contacts a lower surface of the part and forces the part into the pre-stressed position.

20. The apparatus of claim 16 wherein the reinforcing part is configured to extend through an aperture extending through the part, wherein the aperture is the feature.

\* \* \* \* \*